(12) United States Patent
Barton

(10) Patent No.: US 10,037,459 B2
(45) Date of Patent: Jul. 31, 2018

(54) REAL-TIME FONT EDGE FOCUS MEASUREMENT FOR OPTICAL CHARACTER RECOGNITION (OCR)

(71) Applicant: Sage Software, Inc., Irvine, CA (US)

(72) Inventor: Scott E. Barton, Cartersville, GA (US)

(73) Assignee: Sage Software, Inc., Irvine, CA (US)

( * ) Notice: Subject to any disclaimer, the term of this patent is extended or adjusted under 35 U.S.C. 154(b) by 0 days.

(21) Appl. No.: 15/241,598

(22) Filed: Aug. 19, 2016

(65) Prior Publication Data

US 2018/0053046 A1 Feb. 22, 2018

(51) Int. Cl.
| | |
|---|---|
| G06K 9/46 | (2006.01) |
| G06K 9/40 | (2006.01) |
| G06K 9/00 | (2006.01) |
| G06Q 40/00 | (2012.01) |
| G06T 7/00 | (2017.01) |

(52) U.S. Cl.
CPC ..... *G06K 9/00442* (2013.01); *G06K 9/00758* (2013.01); *G06K 9/4604* (2013.01); *G06Q 40/12* (2013.12); *G06T 7/0085* (2013.01)

(58) Field of Classification Search
CPC ............. G06K 9/00442; G06K 9/4604; G06K 9/00758; G06Q 40/12
USPC ....... 382/182, 181, 192, 266, 190, 195, 199, 382/254
See application file for complete search history.

(56) References Cited

U.S. PATENT DOCUMENTS

| | | | |
|---|---|---|---|
| 3,967,243 A | 6/1976 | Kawa et al. | |
| 5,640,466 A | 6/1997 | Huttenlocher et al. | |
| 5,740,330 A | 4/1998 | Abe et al. | |
| 5,825,937 A * | 10/1998 | Ohuchi | G06T 5/20 382/261 |
| 6,671,395 B1 | 12/2003 | Crowhurst et al. | |
| 7,043,080 B1 | 5/2006 | Dolan et al. | |
| 7,447,362 B2 * | 11/2008 | Lev | G06K 9/228 382/200 |
| 7,825,963 B2 | 11/2010 | Trimeche et al. | |
| 8,320,708 B2 | 11/2012 | Kurzweil et al. | |
| 8,385,971 B2 * | 2/2013 | Rhoads | G06F 17/30244 382/162 |
| 8,837,833 B1 | 9/2014 | Scheiner et al. | |

(Continued)

OTHER PUBLICATIONS

International Search Report and Written Opinion issued in International Application No. PCT/US2016/41547, dated Oct. 4, 2016.

(Continued)

*Primary Examiner* — Sheela C Chawan
(74) *Attorney, Agent, or Firm* — Meunier Carlin & Curfman LLC

(57) ABSTRACT

A system and process of generating an improved image for optical character recognition is disclosed comprising dynamically obtaining a video source image comprising one or more characters on a background using a video capture device; detecting edges of at least one of the one or more characters that comprise the video source image; determining a sharpness value for the edges of the at least one of the one or more characters, wherein the sharpness value is related to the ability of the video capture device to distinguish the edges of the characters from the background; and indicating at least when the sharpness value is at a predetermined value or within a predetermined range of values.

33 Claims, 12 Drawing Sheets

(56) References Cited

U.S. PATENT DOCUMENTS

| | | | |
|---|---|---|---|
| 9,064,174 | B2 | 6/2015 | Nister et al. |
| 9,262,689 | B1 | 2/2016 | Sikka et al. |
| 9,418,316 | B1 | 8/2016 | Liu et al. |
| 9,576,210 | B1 * | 2/2017 | Liu .................. G06T 5/003 |
| 9,626,582 | B2 * | 4/2017 | Beato ................. G06K 9/4652 |
| 9,684,984 | B2 * | 6/2017 | Barton ................. G06T 11/40 |
| 9,740,927 | B2 * | 8/2017 | Deryagin ........... G06K 9/00456 |
| 2003/0142865 | A1 | 7/2003 | Hirota et al. |
| 2003/0185448 | A1 | 10/2003 | Seeger et al. |
| 2004/0022451 | A1 | 2/2004 | Fujimoto et al. |
| 2006/0008147 | A1 * | 1/2006 | Jung .................. G06K 9/2054 382/176 |
| 2007/0127815 | A1 | 6/2007 | Karidi et al. |
| 2007/0217701 | A1 | 9/2007 | Liu et al. |
| 2008/0049107 | A1 | 2/2008 | Hii et al. |
| 2009/0060330 | A1 | 3/2009 | Liu et al. |
| 2009/0274369 | A1 | 11/2009 | Sano et al. |
| 2010/0166318 | A1 * | 7/2010 | Ben-Horesh ........ G06K 9/346 382/195 |
| 2010/0331043 | A1 * | 12/2010 | Chapman ............ G01C 21/20 455/556.1 |
| 2011/0007970 | A1 | 1/2011 | Saund et al. |
| 2011/0123115 | A1 | 5/2011 | Lee et al. |
| 2011/0249897 | A1 | 10/2011 | Chaki et al. |
| 2013/0155474 | A1 | 6/2013 | Roach et al. |
| 2013/0242054 | A1 | 9/2013 | Chiu et al. |
| 2013/0335424 | A1 | 12/2013 | Wang et al. |
| 2014/0218493 | A1 | 8/2014 | Dialameh et al. |
| 2014/0270528 | A1 | 9/2014 | Ramos et al. |
| 2014/0368688 | A1 | 12/2014 | John Archibald et al. |
| 2015/0049948 | A1 | 2/2015 | Ba La |
| 2015/0248775 | A1 | 9/2015 | Freeman |
| 2016/0300116 | A1 | 10/2016 | Yasunaga et al. |

OTHER PUBLICATIONS

International Search Report and Written Opinion issued in Application No. PCT/US2016/41552, dated Oct. 6, 2016.

Wikipedia. "Canny Edge Detector." Retrieved from "https://en.wikipedia.org/w/index.php?title=Canny_edge_detector&oldid=702997772" on Feb. 9, 2016. 9 pages.

Wikipedia. "Otsu's Method." Retrieved from "https://en.wikipedia.org/w/index.php?title=Otsu%27s_method&oldid=704009845" on Feb. 9, 2016. 7 pages.

Wikipedia. "Sobel Operator." Retrieved from "https://en.wikipedia.org/w/index.php?title=Sobel_operator&oldid=700766553" on Feb. 9, 2016. 7 pages.

International Search Report and Written Opinion issued in Application No. PCT/US2017/047759, dated Oct. 10, 2017.

* cited by examiner

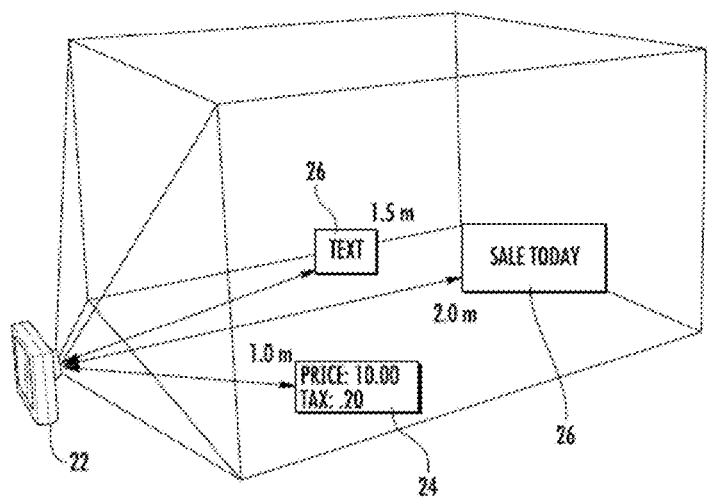
FIG. 2
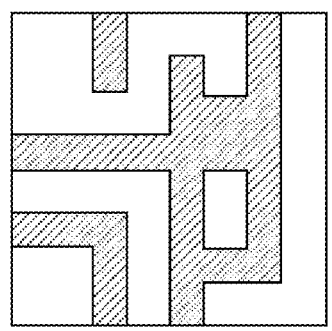
FIG. 3
| 1 | 1 | 0 | 1 | 1 | 1 | 0 | 1 |
|---|---|---|---|---|---|---|---|
| 1 | 1 | 0 | 1 | 0 | 1 | 0 | 1 |
| 1 | 1 | 1 | 1 | 0 | 0 | 0 | 1 |
| 0 | 0 | 0 | 0 | 0 | 0 | 0 | 1 |
| 1 | 1 | 1 | 1 | 0 | 1 | 0 | 1 |
| 0 | 0 | 0 | 1 | 0 | 1 | 0 | 1 |
| 1 | 1 | 0 | 1 | 0 | 0 | 0 | 1 |
| 1 | 1 | 0 | 1 | 0 | 1 | 1 | 1 |
FIG. 4

```
Trans: 1e824e4f-418b-4b19-9498-1

Popsi - Mountain Dew Diet (18$1
Mar's - Snickers Bar 1.86 (18$1

Tax
Total
```

REAL-TIME FONT EDGE FOCUS MEASUREMENT FOR OPTICAL CHARACTER RECOGNITION (OCR)

FIELD OF THE INVENTION

The present invention is related to optical character recognition and in particular the measurement of the focus sharpness of edges of fonts to determine when to capture an image in order to improve the accuracy of optical character recognition.

BACKGROUND OF THE INVENTION

Consumers have flocked to mobile devices for a range of applications. Popular applications include budgeting and banking applications. To use these applications, a consumer will, for example, take a photo of a paper document that is a receipt or a check. The mobile device then performs some type of optical character recognition on the document, turning the raw image into alphanumeric character data for storage.

Despite some success, consumers are often frustrated by the inaccuracy of the optical character recognition (OCR) process. There are at least several reasons for these inaccuracies. Unlike large, fixed scanners, handheld electronic devices struggle to capture good images for OCR processing. For example, handheld mobile (and other electronic) devices are prone to unsteady and imperfect photographing of the document. In addition, lighting and backgrounds can vary introducing artefacts and/or affecting the amount of contrast in the image. A handheld device can also suffer from skew introduced by not having the camera's focal plane square with the document itself.

Other challenges are introduced by the documents themselves. Documents have differing characteristics, such as varying fonts, and the OCR process can fail to interpret various stylistic font differences. Varied documents also have varied sizes—leading many banking applications to focus just on checks having a predictable size.

Current applications focus on a mixture of guiding the consumer to take better images and image processing in an attempt to improve accuracy. For example, some banking applications provide the consumer a frame in which to position the check to avoid skew and improve the resolution of the check image. These applications may also reject a check that is insufficiently clear. Conventional image processing can include binarization to remove background artefacts. However, digital cameras auto-focus on the image as a whole, rather than on individual objects such as fonts. In the context of acquiring images or receipts, checks, etc. for extraction of data for OCR processing, this leads to images containing blurry fonts. Blurry text fonts in the source image result in substandard OCR results. It is therefore desirable to improve the accuracy and efficiency of image capture and OCR processing of documents, especially documents captured using handheld electronic devices.

SUMMARY OF THE INVENTION

Implementations of the present invention include a system and method for generating an improved image for optical character recognition. A real-time continuous video source image comprising one or more characters on a background is dynamically obtained using a video capture device such as a digital camera in a smartphone. The video source image is provided to a processor and the processor dynamically detects the edges of characters that comprise the video source image while continuously receiving the image. The "crispness" or a sharpness value for the edges of the at least one of the one or more characters is dynamically measured while the video source image is continuously received by the processor. The sharpness value is related to the ability of the video capture device to distinguish the edges of the characters from the background. The sharpness value can be related to lighting conditions, distance of the video capture device from the characters on the background, skew of the video capture device to the characters on the background, and the like. When the sharpness value is at a predetermined value or within a range of predetermined values, an indicator is provided to the user of the video capture device, or the device is automatically triggered to capture a still image of the video source image when the sharpness value is at the predetermined value or within the predetermined range of values.

In one implementation, a method of generating an improved image for optical character recognition is disclosed comprising dynamically obtaining a video source image comprising one or more characters on a background using a video capture device; detecting edges of at least one of the one or more characters that comprise the video source image; determining a sharpness value for the edges of the at least one of the one or more characters, wherein the sharpness value is related to the ability of the video capture device to distinguish the edges of the characters from the background; and indicating at least when the sharpness value is at a predetermined value or within a predetermined range of values.

The video capture device can be automatically triggered to capture a still image of the video source image when the sharpness value is at the predetermined value or within the predetermined range of values.

The still image can be used for optical character recognition.

Dynamically obtaining the video source image containing characters on a background using the video capture device can comprises dynamically capturing the video source image of a document comprising the characters on the background using the video capture device. The document may be a purchase receipt.

The video capture device may comprise a camera in a smartphone and the processor used to perform the detecting, determining and indicating actions can be a processor in the smartphone. The indication of at least when the sharpness value is at a predetermined value or within a predetermined range of values may comprise providing the indication on the smartphone. The indication of the smartphone may comprise one or more of a visual, audible or haptic indication.

Determining the sharpness value for the edges of the characters, wherein the sharpness value is related to the ability of the video capture device to distinguish the edges of the character from the background may comprise determining an average sharpness value of a plurality of characters.

The sharpness value changes based on movement or change in focus of the image capture device.

Detecting the edges of at least one of the one or more characters that comprise the video source image may comprise contouring the at least one of the one or more characters, creating an image pixel map of the at least one of the one or more characters; filtering the image pixel map to remove noise and to sharpen the edges of the at least one of the one or more characters that comprise the image pixel map; reducing the image pixel map to a single-channel grayscale pixel bitmap matrix; finding font edge graduations level for a kernel window passed over the single-channel grayscale pixel bitmap matrix; and storing the font edge graduation levels as intensity values in an array representing a blurry edge map of the grayscale pixel bitmap matrix, wherein the intensity values are stored in array locations that match pixel locations of the image pixel map.

Determining the sharpness value for the edges of the at least one of the one or more characters, wherein the sharpness value is related to the ability of the video capture device to distinguish the edges of the characters from the background, am comprise sorting the intensity values in the array to determine a maximum intensity value and assigning the maximum intensity value as the sharpness value.

Finding font edge graduations level for a kernel window passed over the single-channel grayscale pixel bitmap matrix may include estimating a gradient of the at least one of the one or more characters in the video source image.

Sharpening the edges of the at least one of the one or more characters that comprise the image pixel map may include determining an absolute gradient magnitude at points within the video source image. Sharpening the edges of the at least one of the one or more characters that comprise the image pixel map may include using a Sobel operator.

Estimating the gradient of the characters includes estimating the gradient of the characters in a first direction, or it may further include estimating the gradient of the characters in a second direction.

Creating an image pixel map of the at least one of the one or more characters may further comprise determining a contour of the at least one of the one or more characters. Determining the contour may include determining contour points. Determining the contour may include determining a contour hierarchy. Determining the contour can include using a Suzuki and Abe algorithm. Determining the contour may include using hierarchical border following. Contours with less than three contour points may be dropped. The contour points may be approximated as polygonal curves. Approximating the contour points may include reducing the contour to a simple closed polygon.

These and other features and advantages of the present invention will become more readily apparent to those skilled in the art upon consideration of the following detailed description and accompanying drawings, which describe both the preferred and alternative embodiments of the present invention.

BRIEF DESCRIPTION OF THE DRAWINGS

FIG. 2 is an illustration showing a handheld electronic device having a camera with a focal region and a particular defined focal length;

FIGS. 3 and 4, respectively, show an exemplary black-and-white image and its connected component matrix that can be used in a contour tracing process, which uses the size of each element or pixel to measure the height and width of the sequence;

DETAILED DESCRIPTION OF THE INVENTION

Figure 1A:
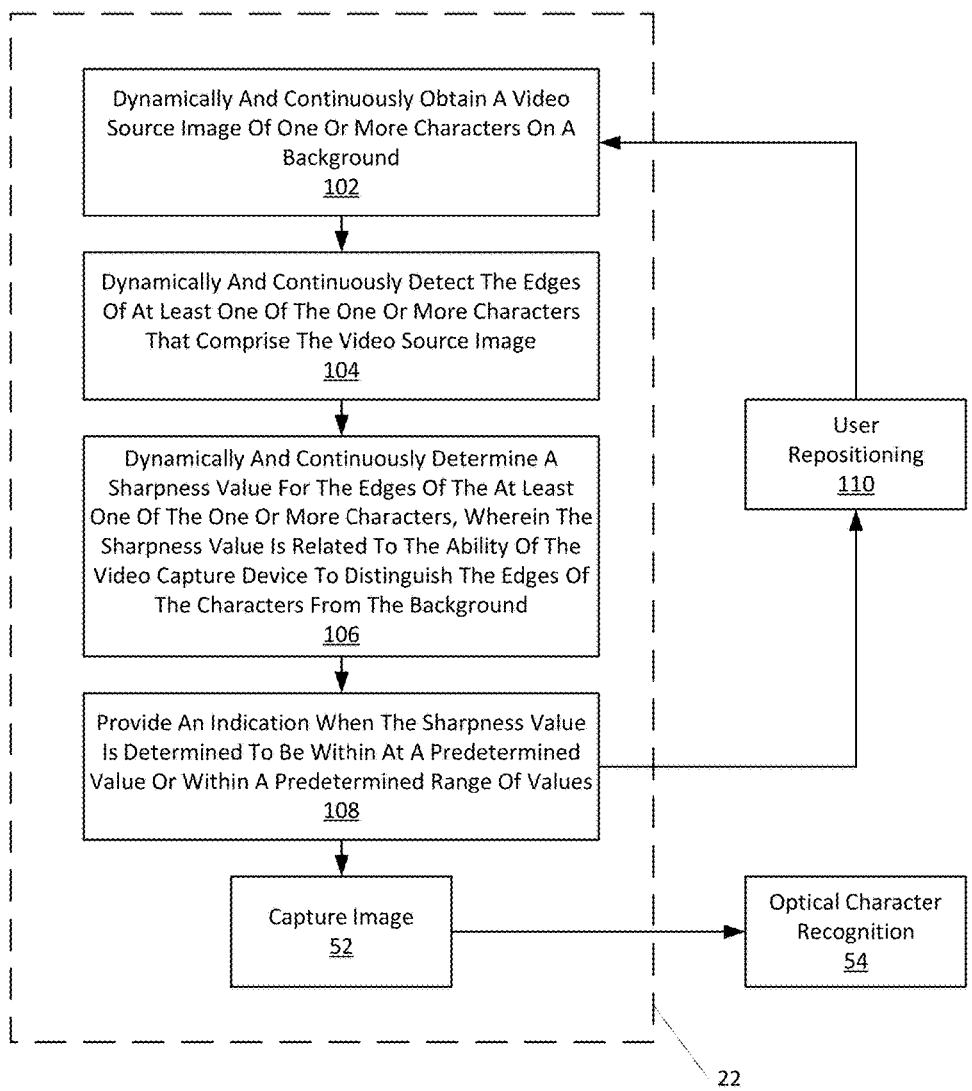
FIGS. 1A and 1B illustrate an exemplary method and overview system for method for generating an improved image for optical character recognition that improves the likelihood of successful OCR processing.

The present invention now will be described more fully hereinafter with reference to specific embodiments of the invention. Indeed, the invention can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms. "Exemplary" means "an example of" and is not intended to convey an indication of a preferred or ideal embodiment. "Such as" is not used in a restrictive sense, but for explanatory purposes.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a handheld electronic device, a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Implementations of the present invention include a system and method for generating an improved image for optical character recognition. A real-time continuous video source image comprising one or more characters on a background is dynamically obtained using a video capture device such as a digital camera in a smartphone. The video source image is provided to a processor and the processor dynamically detects the edges of characters that comprise the video source image while continuously receiving the image. The "crispness" or a sharpness value for the edges of the at least one of the one or more characters is dynamically measured while the video source image is continuously received by the processor. The sharpness value is related to the ability of the video capture device to distinguish the edges of the characters from the background. The sharpness value can be related to lighting conditions, distance of the video capture device from the characters on the background, skew of the video capture device to the characters on the background, and the like. When the sharpness value is at a predetermined value or within a range of predetermined values, an indicator is provided to the user of the video capture device, or the device is automatically triggered to capture a still image of the video source image when the sharpness value is at the predetermined value or within the predetermined range of values.

Figure 1B:
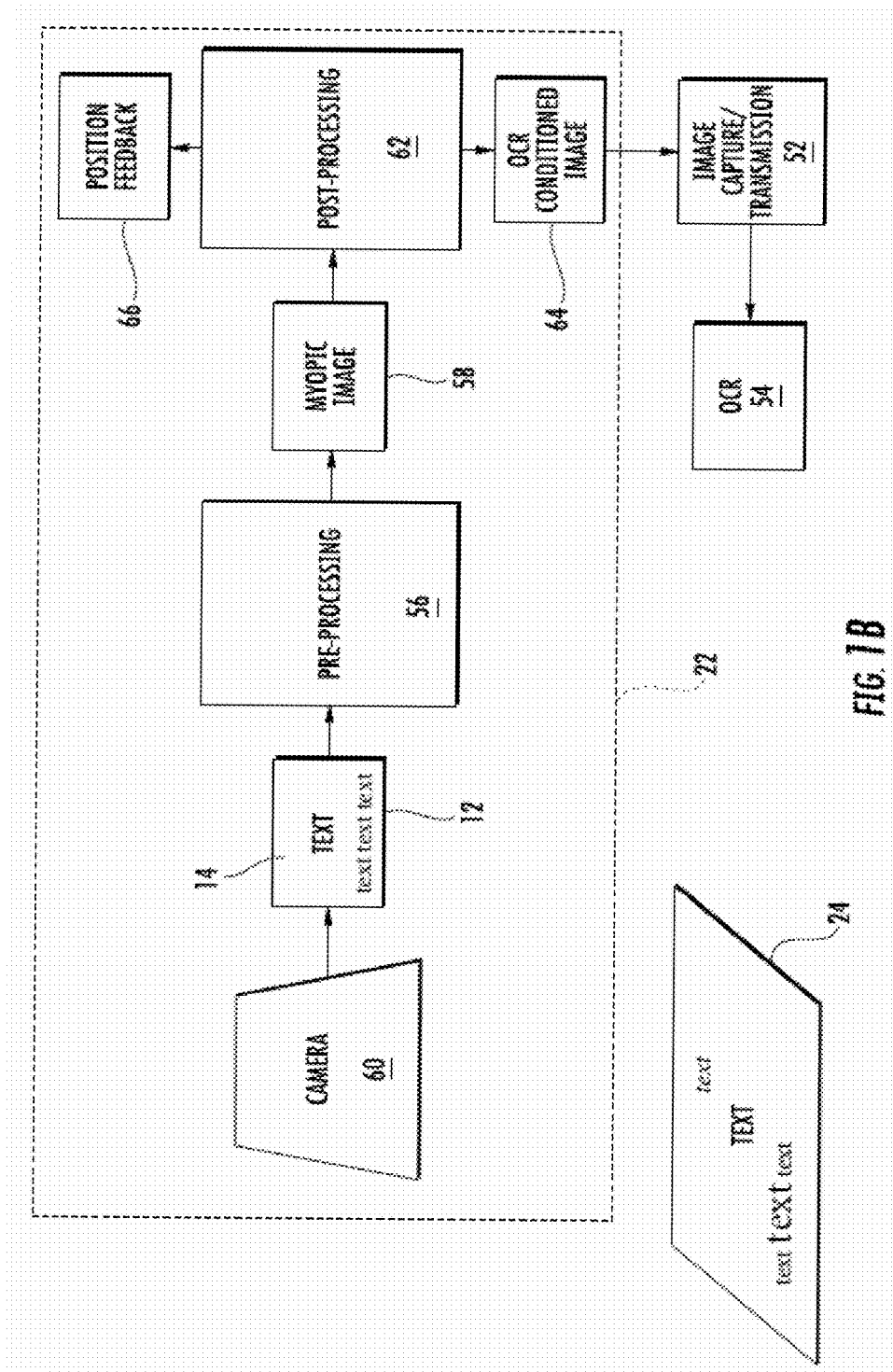

Generally, as shown in FIGS. 1A and 1B, the method may include 102 dynamically and continuously obtaining a video source image comprising one or more characters on a background using a video capture device. For example, a hand-held device comprising a video capture device (e.g., camera) 60 and a processor, such as a smartphone in video mode, may be used to continuously acquire a video source image of a document having characters thereon such as a receipt or check. Generally, the video source image 12 is acquired using a camera 60 of a handheld electronic device 22. As the video capture device 60 continuously obtains an image of the characters on the background, the video source image is provided to the processor of the hand-held device 22. The processor 104 dynamically and continuously detects the edges of at least one of the one or more characters that comprise the video source image. The processor 106 also dynamically and continuously determines a sharpness value for the edges of the at least one of the one or more characters, wherein the sharpness value is related to the ability of the video capture device to distinguish the edges of the characters from the background. At 108, once the sharpness value is determined by the processor to be within at a predetermined value or within a predetermined range of values, an indication is provided. For example, the indication may be visual (on the display of the hand-held device, audible, haptic, or a combination. The user of the hand-held device may be repositioning 110 the hand-held device during the dynamic and continuous processes of 102, 104, 106 and 108 in order to bring the sharpness value to the predetermined value or within the predetermined range of values. At 52, a still image of the video source image is captured when the sharpness value is at the predetermined value or within the predetermined range of values. This may be performed manually or automatically by the processor. The captured still image can then be used for OCR 54 as the improved OCR conditioned image 64 can be transmitted 52 or otherwise provided to an OCR processing system 54.

As shown in FIG. 2, a handheld electronic device 22 has a camera with a focal region (within the box) and a particular defined focal length. Various documents or other objects or images 24 within the focal region may be picked up within an image generated by the electronic device 22. For example, the consumer may hold up a foreground document 24 (such as a receipt) and behind it may be various background objects or documents 26—such as a signs within a restaurant generating the receipt. An issue with the background documents 26 is that they might get captured in the OCR process and/or may interfere with the OCR of characters 14 on the foreground document 24.

Some aspects of the present invention address this issue by providing (in a simplified description not necessarily capturing all possible permutations or complexities) a process for capture of information based on the "crispness" or sharpness value for the edges of the at least one of the one or more characters 14 on the foreground document, wherein the sharpness value is related to the ability of the video capture device to distinguish the edges of the characters from the background, which helps to exclude background objects. The image capture effectively blurs, attenuates and/or eliminates artefacts or other characters that don't meet a predefined sharpness value or range of sharpness values—thus improving the accuracy of the OCR process.

Generally, the process of generating an improved image for optical character recognition involves detecting 104 the objects through a contour tracing and edge detection process. Contours are often obtained from edges, but they are aimed at being object contours. Thus, the characters need to be closed objects. Trees or lists of elements in the image matrix create sequences in which every entry in the sequences encodes information about the location of the next point of the object. The contouring of objects allows for connected components to be stored and measured with their relative sizes.

The contour tracing process gathers objects and sizes. These objects and sizes are used to determine the average text object size on the foreground document 24. The contour tracing process includes detection of edges that yield contours of the underlying object. Generally, the objects with contours will be closed objects. The matrix of a particular image includes trees or lists of elements that are sequences. Every entry into the sequence encodes information about the location of the next point of the object or character.

FIGS. 3 and 4, respectively, show an exemplary black-and-white image and its connected component matrix. The contour tracing process uses the size of each element or pixel to measure the height and width of the sequence. As a result, the contour tracing process has determined how many characters or objects are in the nearsighted image and the size of each object or character.

Figure 5:
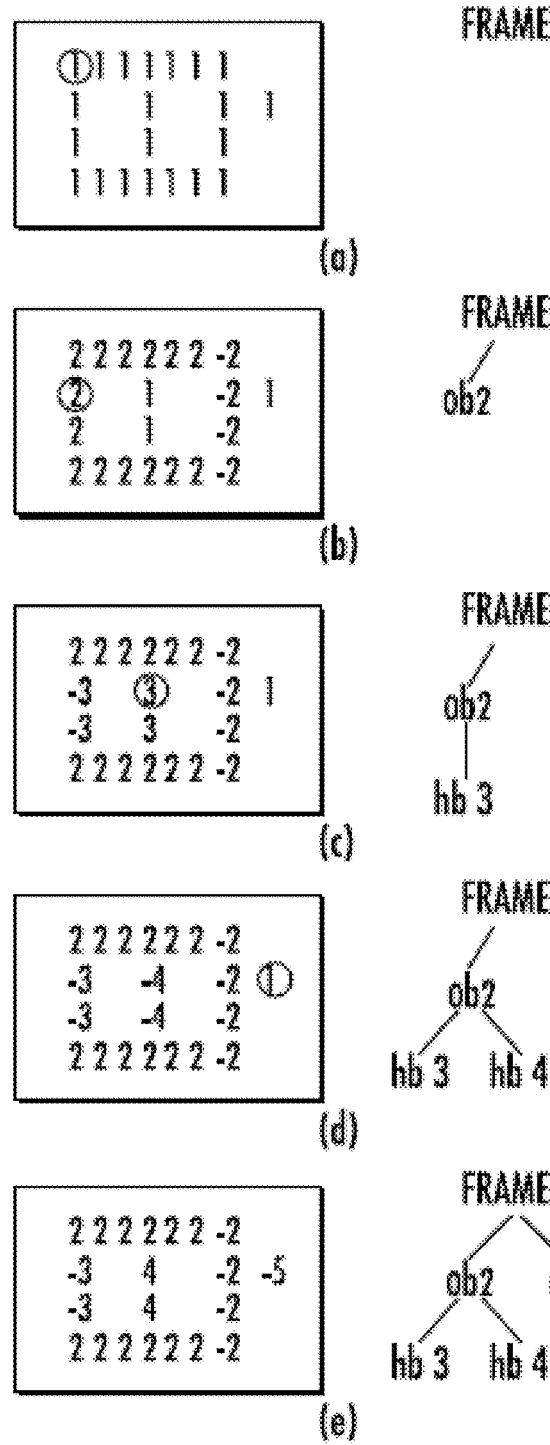
FIG. 5 shows an example of the Suzuki and Abe process building the sequence (in the form of a tree of elements) from an image.
Figure 6:
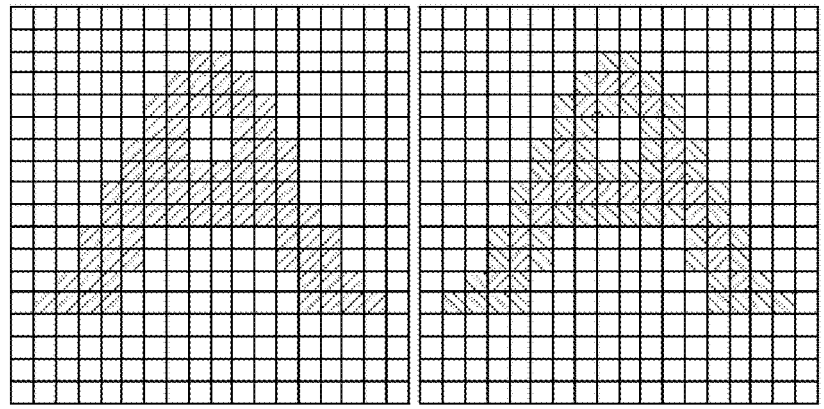
FIG. 6 shows before (left) and after (right) images where the algorithm traced the contours of an "A" character.

An exemplary process for contour tracing includes using the Suzuki and Abe algorithm. Generally, the algorithm determines topographical information about contours of objects using hierarchical border following. FIG. 5 shows an example of the Suzuki and Abe process building the sequence (in the form of a tree of elements) from an image. FIG. 6 shows before (left) and after (right) images where the algorithm traced the contours of an "A" character. As an additional step, contour tracing includes elimination of contours with less than three contour points or not enough points to form a character or desired object.

Figure 7:
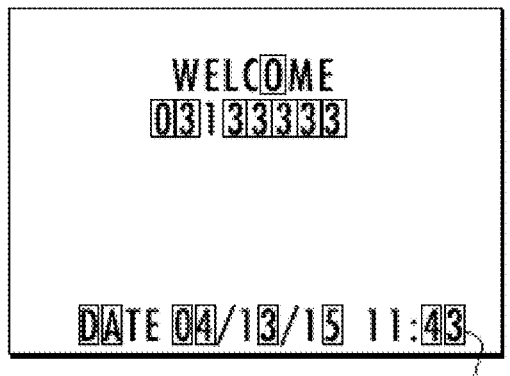
FIGS. 7 and 8 show portions of a bounding process where a bounding row box or rectangle can be placed around each character (as shown in FIG. 7) and a row of characters (as shown in FIG. 8) and the bounded boxes can be used to determine the average object or character size.
Figure 8:
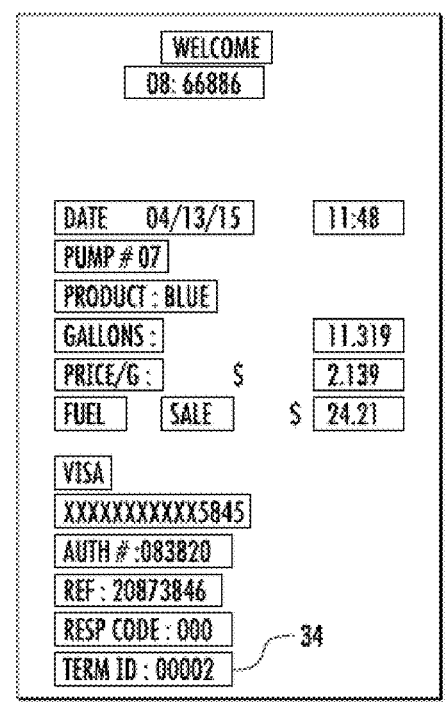

Referring to FIGS. 7 and 8, contour tracing also can include a shape approximation process. Assuming that most contour points form polygonal curves with multiple vertices, the shape can be approximated with a less complex polygon. The shape approximation process may include, for example, the Ramer-Douglas-Peucker (RDP) algorithm. The RDP algorithm finds similar curves with fewer points with a dissimilarity less than or equal to a specific approximation accuracy. The shape approximation process facilitates bounding 34 by reducing the contours of the characters to simple polygon closed shapes.

In one implementation, the following variables are submitted to the Suzuki and Abe application:

```
Objects objects [ ] //- array of objects
Objects objects2[ ] //- array of objects meeting filtered size and component
FindObjects( in = outputImage, out = objects, FindOutsideOnlyContour)
```

Notably, this submission is only concerned with the outside shape of the objects to allow them to be bound within another shape, such as a box which represents the minimum and maximum x and y pixel coordinates of the object.

The bounding 34 process places a peripheral boundary around each character and around each row of characters 14. For example, a bounding row box or rectangle 34 can be placed around each character (as shown in FIG. 7) and a row of characters 14 (as shown in FIG. 8). The process uses the bounding row rectangle 34 to determine the average object or character size.

The bounding 34 process calculates and returns the minimal up-right bounding rectangle 34 for the specified point in an approximated contour for an object or character. The contour of the object is used to approximate a row of text objects. The height of the rows are then averaged to get an average character font height for the document. In exemplary pseudocode, the process submits variables for averaging the height and returning an average object size height:

```
long heightSum = 0
double fontScale = 0
for(int i=0; i < rects.size( ); i++)
{
   heightSum += rects[i].height;
}
if(rects.size( ) > 1)
{
   fontScale = heightSum / rects.size( )
}.
```

Optionally, the bounding 34 process may include a filter that excludes objects of certain size parameters. For example, polygon objects with fewer than 2 or 3 components may be excluded. A more complex filter of objects outside a 2 to 19 font size is shown by the following pseudocode:

```
for(int i = 0; i < objects2.size( ); i++)
{
   // When we move the camera far away,
   // the bounding rectangle can become 2 lines combined
      // filter these out
   if( (objects2[i].Rect.width / 1.5 ) > objects2[i].Rect.height)
   {
         // Keep objects that are 2 pixels to 19 pixels in size
      if(objects2[i].Rect.height > 1 &&
            objects2[i].Rect.height < 20 )
      {
         rects.add(objects2[i].Rect);
      }
   }
}
``` wherein the filter blocks arrays of rectangles around objects wherein a width of the array is not at least 50% larger than the height. Also, the filter may exclude objects (characters) that have a size less than 2 pixels and greater than 19 pixels. Although other filter parameters are possible, the inventors have found that these parameters work well for images of financial documents such as receipts.

In another aspect of the present invention, as shown in FIGS. 1A and 1B, the source images 12 may be obtained 102 continuously and processed (104, 106 and 108) to determine an average sharpness value and used in a feedback loop 110 to facilitate repositioning the handheld electronic device 22. Generally, then, the process may use real-time feedback 66 on the size of the object in the source images 12 to determine and provide feedback or otherwise facilitate improved relative positioning of the handheld electronic device 22 and the foreground document 24 to improve OCR accuracy.

Figure 9:
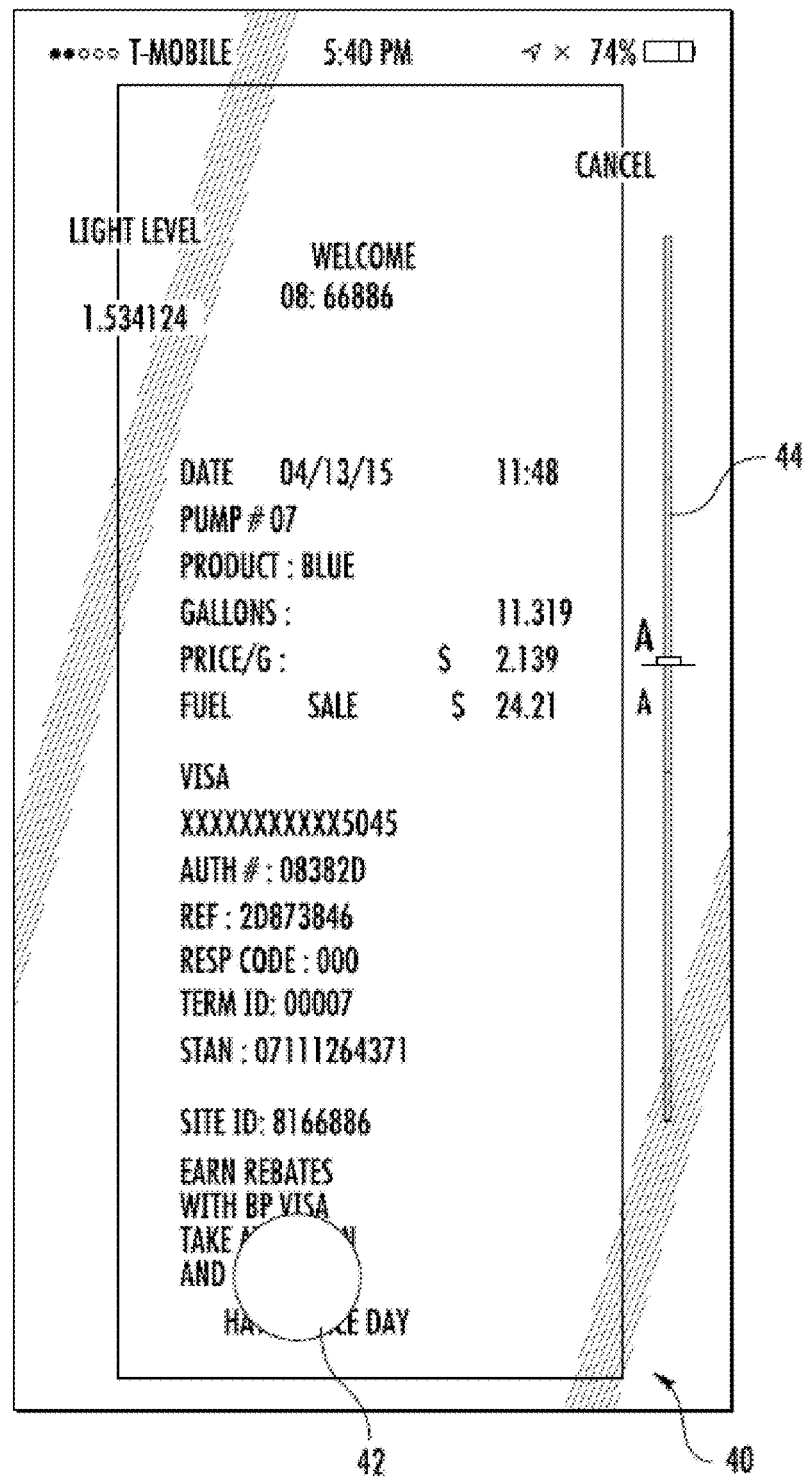
FIG. 9 shows a graphical display on the handheld electronic device.

FIG. 9 shows a graphical display 40 on the handheld electronic device 22. The graphical display 40 includes an image of a foreground document 24 that is currently being processed by a processor of the handheld electronic device 22. The graphical display 40 also includes a capture button 42 and a slider bar 44. The capture button 42 activates capture, storage and/or transmission of the image and/or the results of an OCR process on the image, preferably when the application communicates appropriate positioning of the device. Alternative or in addition, the application may have an automated feature where the image is automatically captured for further storage or processing when within the appropriate range of positions.

Figures 10, 11:
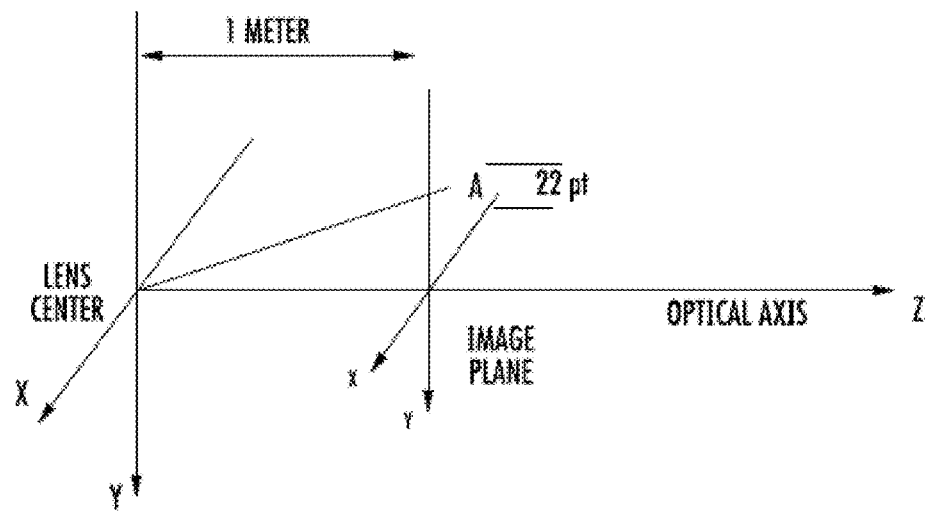
FIG. 10 shows a schematic of the relative (1 m along the optical axis) positioning of the lens of the camera with respect to the character "A" on the foreground document.
FIG. 11 illustrates and exemplary pair of convolution masks comprising 3×3 pixel rectangles that can be used by a Sobel edge detector.

The slider bar 44 shows a range of relative positioning of the—within the center bar—that the slider may fall and still be within the preferred focal length of the camera. At a frame rate of 20 or 30 frames per second, the slider would readjust based on the current relative positioning. Moving too far out or in would cause the slider to move down or up outside the center bar and/or the center bar to flash a red color. When within the preferred range, the slider bar and center bar may turn green to signal that the image is ready for capturing and further processing. FIG. 10 shows a schematic of the relative (1 m along the optical axis) positioning of the lens of the camera with respect to the character "A" on the foreground document 24. The inventors have found that remarkably, the feedback system disclosed herein can improve positioning to within 1 inch (plus or minus) of the focal length of the lens.

Other aspects of systems and methods also facilitate improved image capture by providing feedback 66 to the consumer on the positioning 50 of the foreground document 24 within an acceptable focal length of the hand held electronic device 22. Generally, the system and method facilitate positioning continuously processing video images, determining a sharpness value of the edges of characters on those images and comparing them to expected sharpness values or ranges of sharpness values. The handheld electronic device 22 then provides feedback 66 that can include visual cues (such as a slider bar and green or red status colors and the like) on a display to guide the consumer in repositioning the camera relative to the document 24. The handheld electronic device 22 may also provide haptic feedback, audible feedback, or combinations thereof.

As shown in FIGS. 1A and 1B, the handheld electronic device 22 dynamically and continuously obtains 10 a stream of video source images 12. The video source images 12 may be generated by a camera 60 attached to, part of or integrated into the handheld electronic device 22. Or, the video source images 12 may already be in a memory of the handheld electronic device 22. Or, the video source images 12 may be received from some other camera or image capture device or from storage associated with such a device. (And combinations of the aforementioned sources may provide the source images 12.)

Despite the availability of other options, most implementations of the present invention are well suited for mobile electronic devices 22 including a camera 60 and generating source images 12 in the present. For example, the handheld electronic device 22 may be a phone with a camera capturing video (and multiple source images per second) of the foreground document 24.

As shown in FIGS. 1A and 1B, 11 and 12, the process includes continuously detecting 104 edges of the source image 12. For example, a Sobel edge detection application or process may be employed for a 2-D spatial gradient measurement on the image. Sobel operators are discrete differentiation operators. Generally, the Sobel edge detection application may approximate an absolute gradient magnitude at each point in a grayscale source image 12. The Sobel edge detection algorithm may be configured with a relatively small window size—such as a window smaller than the expected pixel size of the objects or characters to be processed. For example, the Sobel edge detector has a pair of convolution masks that may be, as shown in FIG. 11, 3×3 pixel rectangles. One of the convolution masks estimates the gradient in the x-direction (Gx or columns) and the other estimates the gradient in the y-direction (Gy or rows). The Sobel operator slides the mask over the source image one pixel at a time—thus it manipulates one square of pixels at a time.

The convolution masks are represented by the following equations and/or pseudo-code:

```
int GX[3][3];
int GY[3][3];
/* 3x3 GX Sobel mask */
GX[0][0] = -1; GX[0][1] = 0; GX[0][2] = 1;
GX[1][0] = -2; GX[1][1] = 0; GX[1][2] = 2;
GX[2][0] = -1; GX[2][1] = 0; GX[2][2] = 1;
/* 3x3 GY Sobel mask */
GY[0][0] = 1; GY[0][1] = 2; GY[0][2] = 1;
GY[1][0] = 0; GY[1][1] = 0; GY[1][2] = 0;
GY[2][0] = -1; GY[2][1] = -2; GY[2][2] = -1;
```

The Sobel operator also calculates the magnitude of the gradient:

$$|G|=\sqrt{Gx^2+Gy^2}$$

Additional pseudo-code illustrates movement of the mask across the image, gradient approximation and other operations in full context.

```
sImage   originalImage; // Input Image
sImage   edgeImage;
--------------------------------------------------*/
for(Y=0; Y<=(originalImage.rows-1); Y++) {
    for(X=0; X<=(originalImage.cols-1); X++) {
        long sumX = 0;
        long sumY = 0;
        /*-------X GRADIENT APPROXIMATION------*/
        for(I=-1; I<=1; I++) {
            for(J=-1; J<=1; J++) {
                sumX = sumX + (int)( (*(originalImage.data + X + I +
                    (Y + J)*originalImage.cols)) * GX[I+1][J+1]);
            }
        }
        /*-------Y GRADIENT APPROXIMATION-------*/
        for(I=-1; I<=1; I++) {
            for(J=-1; J<=1; J++) {
                sumY = sumY + (int)( (*(originalImage.data + X + I +
                    (Y + J)*originalImage.cols)) * GY[I+1][J+1]);
            }
        }
        /*---GRADIENT MAGNITUDE APPROXIMATION (Myler p.218)----*/
        SUM = abs(sumX) + abs(sumY);
```

```
if(SUM>255) SUM=255;
    if(SUM<0) SUM=0;
      *(edgeImage.data + X + Y*originalImage.cols) = 255 - (unsigned char)(SUM);
    }
}
```

Figures 12, 13:
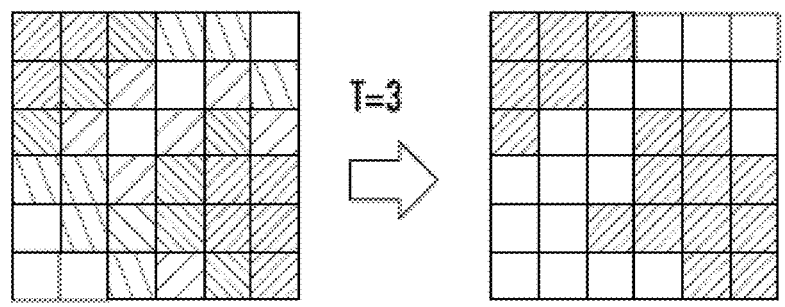
FIG. 12 is an image of the source image after edge detection has been performed on the characters of the source image.
FIG. 13 illustrates a median filter operation over a kernel matrix window by selecting the median intensity in the window.

Generally, then, the Sobel operator changes a pixel's value to the value of the mask output. Then it shifts one pixel to the right, calculates again, and continues to the right until it reaches the end of a row. The Sobel operator then starts at the beginning of the next row. As shown in FIG. 12 the Sobel operator hollows out the internal pixels of the characters and sharpens the edges—generally providing a highlighting effect. Restated, the edge detection highlights the foreground object or text characters to make them bold and have a heavy weight in the grayscale image. Notably, Sobel operators are not the only processes that can detect and sharpen edges— but the inventors have found the Sobel operator and particular mask size to be well-suited for receipts.

Another implementation of the Sobel operator uses the following kernel for noise reduction:

$$x = \begin{bmatrix} -3 & 0 & +3 \\ -10 & 0 & +10 \\ -3 & 0 & +3 \end{bmatrix}$$

$$y = \begin{bmatrix} -3 & -10 & -3 \\ 0 & 0 & 0 \\ +3 & +10 & +3 \end{bmatrix}$$

The kernal window is moved over the image with no scale or shift in delta. This kernal, for example, can be employed with the following variables submitted to the Sobel operator:
  Sobel(in =inputImage, out=outputImage, GrayScale, $x_{order}$=1 and $y_{order}$=0
  Kernel Size=3, scale=1, delta shift=0, DrawSolidBorderOnEdge=Intensity SuroundingWindowPixelsMax)
wherein:

| Rectangle rects[ ] | //- Rectangle Array |
| Image inputImage | //- Pumped in Video Frame |
| Image outputImage | //- Output Image after standard operations |
| Image outputImage2 | //- Output Image after optional operations. |

Kernel selection and size can be adjusted for different foreground object types, such as checks, receipts, business cards, etc. The inventors, however, determined the disclosed particular order of steps and kernel selection to be particularly effective.

In another example, noise reduction can be performed using a median filtering process. In the exemplary median filtering process, a median is determined of all the pixels under a kernel area and a central element of the kernel area is replaced with this median value. One-dimensional signals and images can be filtered with various low-pass filters (LPF), high-pass filters (HPF) etc. A LPF helps in removing noises and removing the blurring of the images etc. a HPF filters helps in finding edges in the images.

Figure 14:
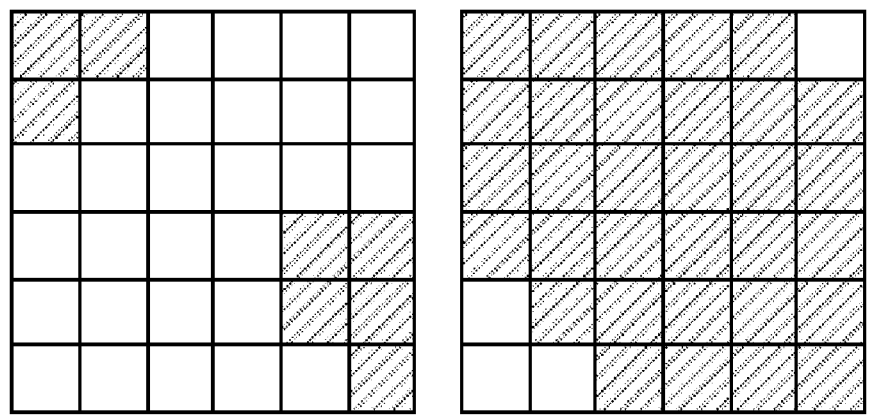
FIG. 14 illustrates and image cleaned by the median filtering process.

As shown in FIG. 13, the median filter operates over a kernel matrix window by selecting the median intensity in the window. Moving the kernel window over the entire image pixel map cleans up the image (see FIG. 14).

As shown in FIGS. 1A and 1B, the method includes dynamically and continuously determines a sharpness value for the edges of the at least one of the one or more characters, wherein the sharpness value is related to the ability of the video capture device to distinguish the edges of the characters from the background. This process involves finding the font edge sharp graduation level for a kernel window floating over the box image and saving the intensities in an array representing a blurry edge map of the font box image. The values are sorted to find the most sharp transitions and measured. Objects not of a common font size or less than a predefined intensity value are filtered out. Exemplary steps include a single channel conversion, filtering of the pixel map, creation of a fake RGB image container, and sorting to find a maximum sharpness value.

In single channel conversion, the image is reduced to a single channel grey scale pixel bitmap matrix. Most digital images are comprised of three separate color channels: a red channel, a green channel, and a blue channel. Layering these channels on top of each other creates a full-color image. To detect edges a single channel image is needed. A pseudo conversion algorithm is as follows:
For Each Pixel in image:

```
{
  Red = Pixel.Red
  Green = Pixel.Green
  Blue = Pixel.Blue
  Gray = (Red * 0.3 + Green * 0.59 + Blue * 0.11)
  Pixel.Red = Gray
  Pixel.Green = Gray
  Pixel.Blue = Gray
}
```

Filtering the pixel map can comprise using the Sobel (as described above) or other edge detection algorithms to build a pixel blur level intensity map. In one example, a Laplacian algorithm can be used. This algorithm involves scanning the grayscale image, and applying the 2D Laplacian matrix to every pixel and its neighbors. As before, the kernel window is applied over the iterated pixel and its neighbors. The summed values in the formula below is the gray to black intensity value for that pixel:

$$\begin{bmatrix} 0 & -1 & 0 \\ -1 & 4 & -1 \\ 0 & -1 & 0 \end{bmatrix} = [f(x+1, y) + f(x-1, y) + f(x, y+1) + f(x, y-1)] -$$

$$4f(x, y) = \begin{bmatrix} 0 & 1 & 0 \\ 1 & -4 & 1 \\ 0 & 1 & 0 \end{bmatrix} =$$

After applying the matrix above to every pixel in the original image, a Laplacian blur intensity map array is built and the edge map matrix is output.

A fake RGB image container is created. The RGB matrix array is filled with the Laplacian blur\crispness transition values so the pixel locations of the original image can be matched. The font edge graduation levels are stored as intensity values in an array representing a blurry edge map of the grayscale pixel bitmap matrix. The intensity values are stored in array locations that match pixel locations of the image pixel map.

Referring back to FIGS. 1A and 1*b*, the method includes determining the sharpness value for the edges of the at least one of the one or more characters. This may comprise sorting the intensity values in the array to determine a maximum intensity value and assigning the maximum intensity value as the sharpness value. Pseudo code for performing this operation is provided below:
Sort to Find the Max Blurry Value (i.e., Greatest Sharpness Value):

```
int rows = finalImage.rows;
int cols= finalImage.cols;
char *pixels = reinterpret_cast<char *>( finalImage.data);
int maxLap = MAX_LAP;
// Sort the highest crisp pixel transition on the image
for (int i = 0; i < (rows*cols); i++) {
   if (pixels[i] > maxLap)
      maxLap = pixels[i];
   }
pixels=NULL;
finalImage.release( );
// Limit our range ... Sometime we might get to 130 on a busy image...
// However this has no impact on our min to determine focus
if( maxLap > 100)
{
   maxLap = 100;
}
blurry_val = maxLap;
```

Camera Detection Pipeline

Figure 15:
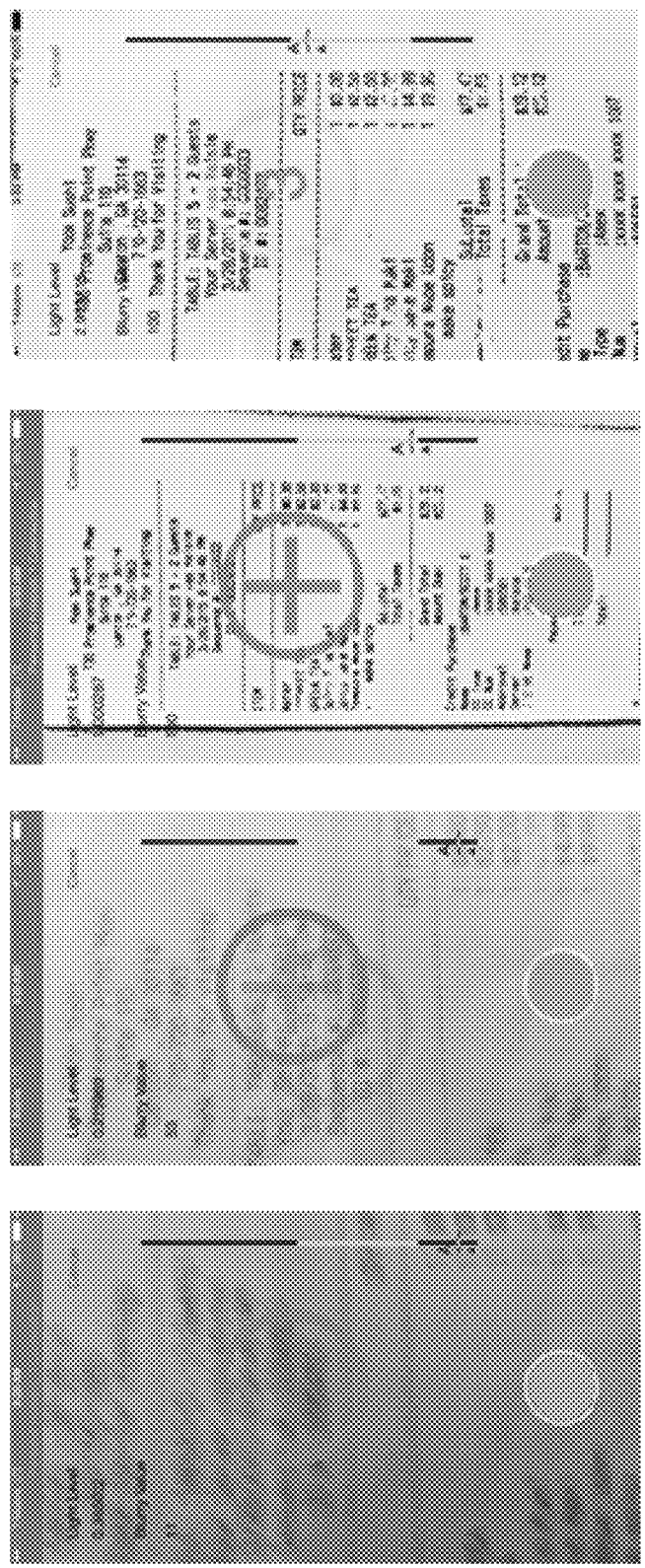
FIG. 15 illustrates images of the capture of a receipt image based on a sharpness value of the edges of characters on the receipt.

The edge sharpness detection pipeline pumps video frames from the raw mobile phone camera through the measurement algorithms at a rate of approximately 20 to 30 frames per second. Background threading isolates the detection from the main applications functionality.
Camera Shutter Control The camera shutter can be controlled by the measurement results from the detection pipeline. A countdown timer or shutter trigger activates based on the results of the font size detection, blurry level, light level and camera tilt skew detection. When all conditions are in the optimum state for an OCR capture of the document, the auto-shutter process starts.
Usage and Utility The feedback in real-time of the font object's edge sharpness measurement is used to determine optimal focus level to capture images for OCR (Optical Character Recognition). The control of the camera shutter until all aspects of the capture are in an optimal state equates to improved recognition of text on a document. FIG. 15 illustrates images of the capture of a receipt image based on a sharpness value of the edges of characters on the receipt.

Figure 16:
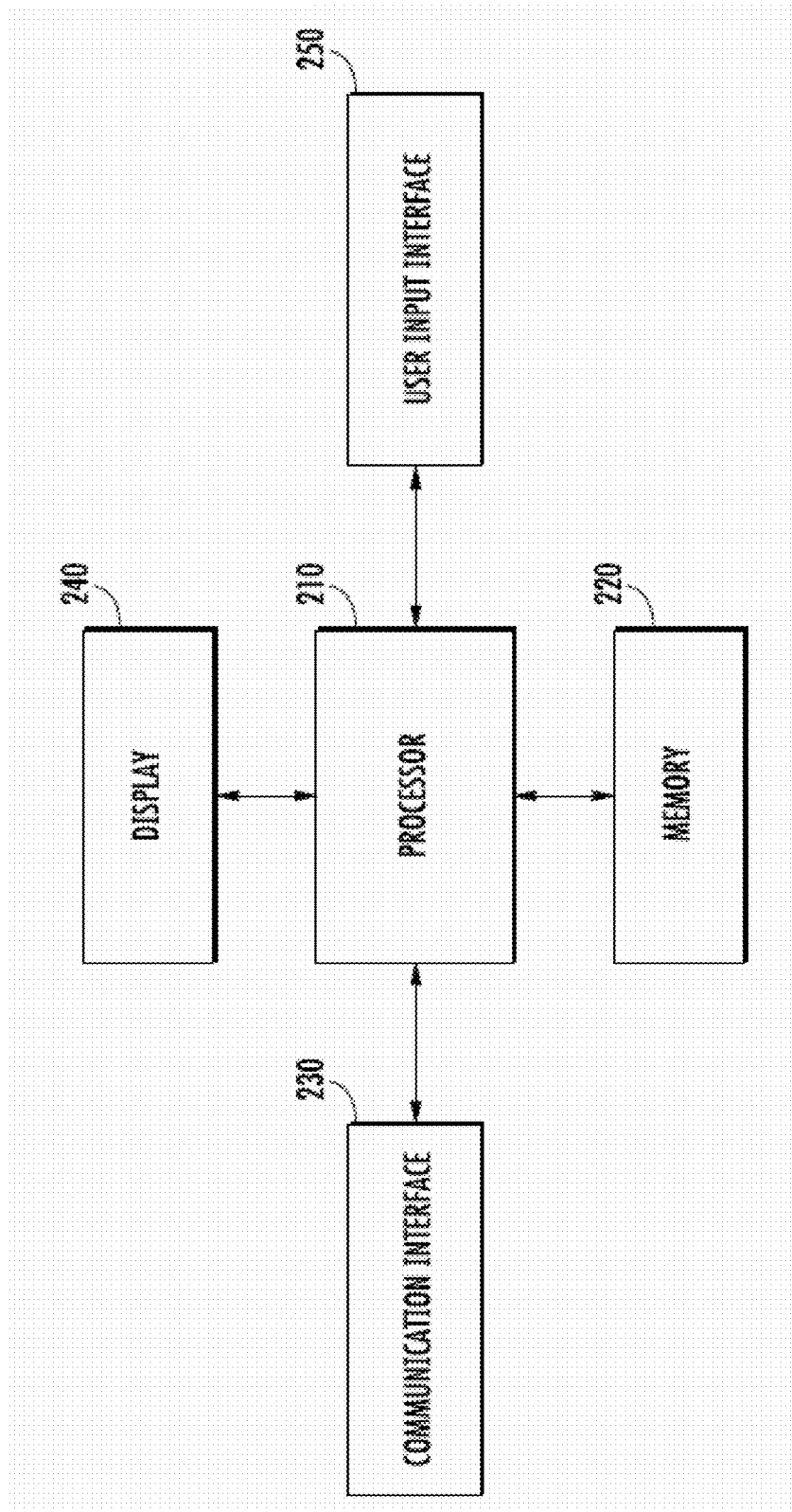
FIG. 16 is a schematic block diagram of an entity capable of performing the processes described herein.

Referring now to FIG. 16, an exemplary block diagram of an entity capable of operating as a handheld electronic device 22 is shown in accordance with one embodiment of the present invention. The entity capable of operating as a handheld electronic device 22 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a handheld electronic device 22 can generally include means, such as a processor 210 for performing or controlling the various functions of the entity. In particular, the processor 210 may be configured to perform the processes discussed in more detail with regard to FIGS. 1A and 1B.

In one embodiment, the processor is in communication with or includes memory 220, such as volatile and/or non-volatile memory that stores content, data or the like. For example, the memory 220 may store content transmitted from, and/or received by, the entity. Also for example, the memory 220 may store software applications, instructions or the like for the processor to perform steps associated with operation of the entity in accordance with embodiments of the present invention. In particular, the memory 220 may store software applications, instructions or the like for the processor to perform the operations described above with regard to FIGS. 1A and 1B.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data such as a keypad, a touch display, a joystick, a camera or other input device.

Figure 17:
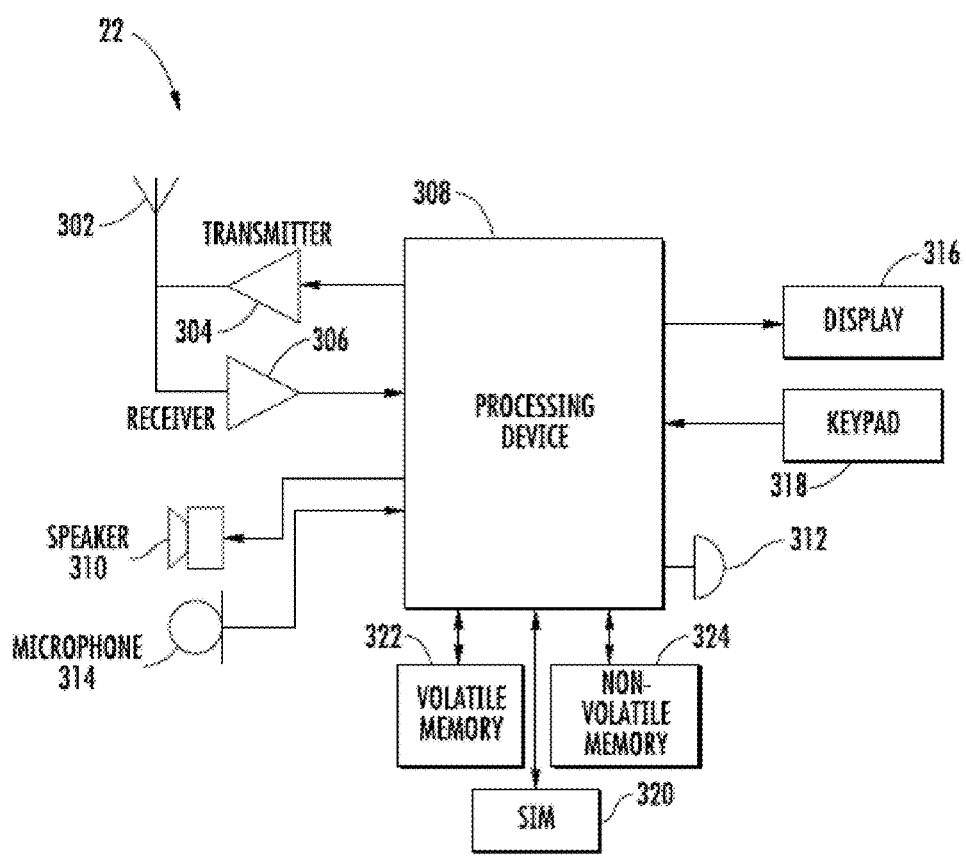
FIG. 17 is a schematic block diagram of an exemplary handheld electronic device mobile station capable of operating in accordance with an embodiment of the present invention.

Reference is further made to FIG. 17, which illustrates one type of electronic device that would benefit from embodiments of the present invention. As shown, the electronic device may be a handheld electronic device 22, and, in particular, a cellular telephone. It should be understood, however, that the device illustrated and hereinafter described is merely illustrative of one type of electronic device that would benefit from the present invention and, therefore, should not be taken to limit the scope of the present invention. While several embodiments of the handheld electronic device 22 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The handheld electronic device 22 includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 17, in addition to an antenna 302, the handheld electronic device 22 includes a transmitter 304, a receiver 306, and an apparatus that includes means, such as a processor 308, controller or the like, that provides signals to and receives signals from the transmitter 304 and receiver 306, respectively, and that performs the various other functions described below including, for example, the functions relating to the processes described in relation to FIGS. 1A and 1B.

As one of ordinary skill in the art would recognize, the signals provided to and received from the transmitter 304 and receiver 306, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G, 3G, 4G, 4G LTE communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like It is understood that the processor 308, controller or other computing device, may include the circuitry required for implementing the video, audio, and logic functions of the mobile station and may be capable of executing application programs for implementing the functionality discussed herein. For example, the processor may be comprised of various means including a digital signal processor device, a microprocessor device, and various analog to digital converters, digital to analog converters, and other support circuits. The control and signal processing functions of the mobile device are allocated between these devices according to their respective capabilities. The processor 308 thus also includes the functionality to convolutionally encode and interleave message and data prior to modulation and transmission. Further, the processor 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The handheld electronic device 22 may also comprise means such as a user interface including, for example, a conventional earphone or speaker 310, a ringer 312, a microphone 314, a display 316, all of which are coupled to the processor 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The handheld electronic device 22 can also include means, such as memory including, for example, a subscriber identity module (SIM) 320, a removable user identity module (R-UIM) (not shown), or the like, which may store information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for performing the processes associated with FIGS. 1A and 1B, as described herein.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Implementations of the present invention provide many advantages. Measurement of the distance of the lens from the paper facilitates capture of a font object size for improved clarity. The improved clarity results in improved OCR recognition rates as compared to freehand capture of the image. Implementations also provide an ability to calculate optimal font size for OCR detection on a live video feed while accounting for optimal focus and clarity. Implementations of the present invention can measure and record optimal focal length and OCR font size ranges on raw video feed. These measurements can be used to guide the camera user through visual cues and indicators to move the camera to the best location in space. This produces a better OCR compatible image for text recognition. The focal ratio determines how much light is picked up by the CCD chip in a given amount of time. The number of pixels in the CCD chip will determine the size of a font text character matrix. More pixels means a bigger font size, regardless of the physical size of the pixels. OCR engines have an expected and optimal size range for character comparison. When fonts are in the optimal range and have clear crisp well defined edges, OCR detection and accuracy is improved. Implementations of the present invention provide guidance to that optimal range.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

That which is claimed:

1. A method of generating an improved image for optical character recognition, the method comprising:
dynamically obtaining, by a processor of a video capture device, a video source image comprising at least a background portion of the video source image and one or more characters located on a document associated with a foreground portion of the video source image;
excluding, by the processor, the background portion of the video source image obtained at a first position with respect to the document and detecting edges of at least one of the one or more characters located on the document associated with the foreground portion, wherein the background portion of the video source image is blurred or eliminated during, or prior to, the detection;
determining, by the processor, a sharpness value for the edges of the at least one of the one or more characters, wherein the sharpness value is related to the ability of the video capture device to distinguish the edges of the one or more characters from the background portion; and
causing, by the processor, capture of an image based on a trigger produced when the determined sharpness value is at a predetermined value or within a predetermined range of values, wherein the captured image is subsequently processed via an optical character recognition operation of, at least, the one or more characters of the foreground portion of the captured image.

2. The method of claim 1, further comprising performing an optical character recognition operation of, at least, the one or more characters of the foreground portion of the captured image.

3. The method of claim 1, wherein the step of dynamically obtaining the video source image comprises dynamically capturing the video source image.

4. The method of claim 3, wherein the one or more characters of the foreground portion of the captured image comprises unstructured text associated with a purchase receipt.

5. The method of claim 4, further comprising: causing, by the processor, output of a notification generated based on the determined sharpness value to facilitate adjustment of the video capture device from the first position to a second position with respect to the document, wherein the second position is different from the first position.

6. The method of claim 1, wherein the video capture device comprises a camera in a smartphone and the processor is a processor in the smartphone.

7. The method of claim 6, wherein the notification comprises one or more outputs on a smartphone selected from the group consisting of a visual output, an audible output, and a haptic output.

8. The method of claim 1, wherein the step of determining the sharpness value for the edges of the characters comprises determining an average sharpness value of a plurality of characters, wherein the average sharpness value is determined from a plurality of sharpness values determined at a plurality of characters identified to be located on the document.

9. The method of claim 1, wherein the determined sharpness value changes based on movement or change in focus of the image capture device.

10. The method of claim 1, wherein the step of detecting, by the processor, the edges of at least one of the one or more characters that comprise the video source image comprises:
contouring the at least one of the one or more characters;
creating an image pixel map of the contoured at least one of the one or more characters;
filtering the image pixel map to remove noise and to sharpen the edges of the at least one of the one or more characters that comprise the image pixel map;
reducing the image pixel map to a single-channel grayscale pixel bitmap matrix;
finding font edge graduations level for a kernel window passed over the single-channel grayscale pixel bitmap matrix; and
storing the font edge graduation levels as intensity values in an array representing a blurry edge map of the grayscale pixel bitmap matrix, wherein the intensity values are stored in array locations that match pixel locations of the image pixel map.

11. The method of claim 10, wherein the step of determining, by the processor, the sharpness value for the edges of the at least one of the one or more characters further comprises:
sorting the intensity values in the array to determine a maximum intensity value and assigning the maximum intensity value as the sharpness value.

12. The method of claim 10, wherein the step of finding font edge graduations level for a kernel window passed over the single-channel grayscale pixel bitmap matrix includes estimating a gradient of the at least one of the one or more characters in the video source image.

13. The method of claim 12, wherein the step of sharpening the edges of the at least one of the one or more characters includes determining an absolute gradient magnitude at points within the video source image.

14. The method of claim 12, wherein the step of estimating the gradient of the characters includes estimating the gradient of the characters in a first direction.

15. The method of claim 12, wherein the step of estimating the gradient of the characters includes estimating the gradient of the characters in a first direction and a second direction.

16. The method of claim 10, wherein the step of sharpening the edges of the at least one of the one or more characters is performed using a Sobel operator.

17. The method of claim 10, wherein the step of creating an image pixel map of the at least one of the one or more characters comprises determining a contour of the at least one of the one or more characters.

18. The method of claim 17, wherein the step of determining the contour includes determining contour points.

19. The method of claim 18, wherein the step of determining the contour includes determining a contour hierarchy.

20. The method of claim 19, wherein the step of determining the contour is performed using a Suzuki and Abe algorithm.

21. The method of claim 19, wherein the step of determining the contour includes using a hierarchical border following operation.

22. The method of claim 18, further comprising dropping contours with less than three contour points.

23. The method of claim 18, further comprising approximating the contour points as polygonal curves.

24. The method of claim 23, wherein the step of approximating the contour points includes reducing the contour to a simple closed polygon.

25. The method of claim 1, wherein the determined sharpness value is determined at all, or at a substantial number of, characters identified to be located on the document of the foreground portion.

26. A system of generating an improved image for optical character recognition, the system comprising:
- a video capture device, wherein the video capture device is configured to dynamically obtain a video source image comprising at least a background portion of the video source image and one or more characters located on a document associated with a foreground portion of the video source image;
- a processor; and
- a memory having instructions stored thereon, wherein execution of the instructions by the processor, cause the processor to:
  - exclude the background portion of the video source image obtained at a first position with respect to the document and detect edges of the at least one of the one or more characters located on the document associated with the foreground portion, wherein the background portion of the video source image is blurred or eliminated during, or prior to, the detection;
  - determine a sharpness value for the edges of the at least one of the one or more characters, wherein the determined sharpness value is related to the ability of the video capture device to distinguish the edges of the one or more characters from the background portion; and
  - cause capture of an image based on a trigger produced when the determined sharpness value is at a predetermined value or within a predetermined range of values, wherein the captured image is subsequently processed via an optical character recognition operation of, at least, the one or more characters of the foreground portion of the captured image.

27. The system of claim 26, wherein the instructions when executed by the processor further cause the processor to perform optical character recognition of, at least, the one or more characters of the foreground portion of the captured image.

28. The system of claim 26, wherein the video capture device comprises a camera in a smartphone.

29. The system of claim 26, wherein the instructions when executed by the processor further cause the processor to: cause an output of a notification generated based on the determined sharpness value to facilitate adjustment of the video capture device from the first position to a second position with respect to the document, wherein the second position is different from the first position.

30. The system of claim 26, wherein the determined sharpness value changes based on movement or change in focus of the image capture device.

31. The system of claim 26, wherein the instructions that cause the processor to detect the edges of at least one of the one or more characters that comprise the video source image comprises instructions that when executed by the processor cause the processor to:
- contour the at least one of the one or more characters;
- create an image pixel map of the contoured at least one of the one or more characters;
- filter the image pixel map to remove noise and to sharpen the edges of the at least one of the one or more characters that comprise the image pixel map;
- reduce the image pixel map to a single-channel grayscale pixel bitmap matrix;
- find font edge graduations level for a kernel window passed over the single-channel grayscale pixel bitmap matrix; and
- store the font edge graduation levels as intensity values in an array representing a blurry edge map of the grayscale pixel bitmap matrix, wherein the intensity values are stored in array locations that match pixel locations of the image pixel map.

32. The system of claim 31, wherein the instructions that cause the processor to determine the sharpness value for the edges of the at least one of the one or more characters comprises instructions that when executed by the processor cause the processor to:
- sort the intensity values in the array to determine a maximum intensity value and assign the maximum intensity value as the sharpness value.

33. The system of claim 26, wherein the determined sharpness value is determined at all, or at a substantial number of, characters identified to be located on the document of the foreground portion.

* * * * *